United States Patent [19]
Pomerantz

[11] 3,734,123
[45] May 22, 1973

[54] CONTROL MEANS REGULATING A SUPPLY OF LIQUIDS

[75] Inventor: Daniel I. Pomerantz, Lexington, Mass.

[73] Assignee: P. R. Mallory & Co. Inc., Indianapolis, Ind.

[22] Filed: July 14, 1971

[21] Appl. No.: 162,418

[52] U.S. Cl. ........137/392, 317/148.5 B, 317/DIG. 3
[51] Int. Cl. ..............................................G05d 9/12
[58] Field of Search............................137/386, 392; 317/148.5 B, DIG. 3; 340/244 C; 73/204, 295

[56] References Cited
UNITED STATES PATENTS

| | | |
|---|---|---|
| 3,412,610 | 11/1968 | Prussin ............................73/295 X |
| 3,421,537 | 1/1969 | Fathauer ..............................137/392 |
| 3,465,587 | 9/1969 | Pierce .....................................73/295 |
| 3,477,460 | 11/1969 | Dotto ....................................137/392 |
| 3,584,643 | 6/1971 | Burke....................................137/392 |
| 3,616,824 | 11/1971 | Orlando ...............................137/392 |

*Primary Examiner*—Martin P. Schwadron
*Assistant Examiner*—David R. Matthews
*Attorney*—Richard H. Childress et al.

[57] ABSTRACT

Liquid flow regulating means is responsive to a switching means, the switching means in turn being responsive to the amount of current flowing through a constant voltage source, the amount of current from the constant voltage source being controlled by a semiconductive current control means which is sensitive to the temperature differences produced by immersion in the liquid.

10 Claims, 3 Drawing Figures

PATENTED MAY 22 1973

INVENTOR
DANIEL I. POMERANTZ
BY Robert F. Meyer
ATTORNEY

CONTROL MEANS REGULATING A SUPPLY OF LIQUIDS

This invention relates to a means regulating the supply of liquids to a liquid storage means; and more particularly to a control means which utilizes a semiconductive regulating means.

There are many applications in the appliance industry where means need to be provided for sensing changing liquid levels. For example in washing machines, control means needs to be provided to shut off a liquid supply to a washing machine as occasion demands. Naturally, the more accurate such control means are, the more accurately the liquid level may be regulated. As will become apparent, the accuracy of the control means of the present invention relies on the temperature change of the control means when it is immersed in the liquid.

The present invention, therefore, relates to a control means regulating the supply of liquid to a storage means and has as one of its objects the provision of liquid level control means which is extremely accurate.

Another object of the invention is to provide a control means regulating the supply of liquids which is sensitive to the cooling effect of the liquid being supplied to the storage means.

Another object of the invention is the provision of a control means regulating the supply of liquid which includes a temperature sensitive semiconductor current control meanS.

Another object of the invention is the provision of a control means regulating a supply of liquid which includes a temperature sensitive semiconductive current control means, a constant voltage source cooperating with the semiconductive current control means to control the amount of current flowing through the voltage source add the semiconductive means, the amount of current from the voltage source regulating a switch and a relay to prevent or permit a liquid to flow from a supply source.

A further object of the invention is the provision of a control means regulating a supply of liquid which includes a diode which is temperature sensitive as the semiconductive current control means.

Another object of the invention is the provision of a control means regulating a supply of liquid which includes a semiconductive current control means which is self heated to a temperature above the temperature of the liquid.

These and other objects of the invention will become apparent from the following description taken in conjunction with the accompanying drawings wherein.

In general, the objects of the invention are accomplished by providing a control means which regulates the supply of liquid to a liquid storage means, the control means comprising a temperature sensitive semiconductive current control means disposed in the liquid storage means, the semiconductive current control means being responsive to the presence or absence of a liquid; a constant voltage source cooperating with the semiconductive current control means so as to control the amount of current flowing through the voltage source and the semiconductive current control means; switching means responsive to the amount of current from the voltage source; and liquid flow regulating means responsive to the switching means.

Figure 1:
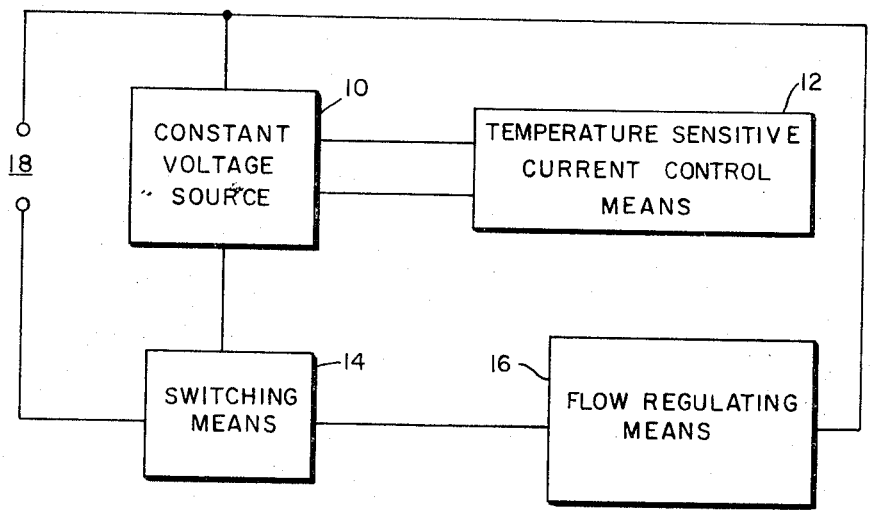
FIG. 1 is a block diagram showing the components of the control means and their relationship.

Refering now to FIG. 1, there is shown a constant voltage source 10 connected to one side of a suitable AC power source 18, the other side of the constant voltage source being connected to switching means 14, the switching means 14 being connected to the other side of the power source. The term "constant voltage source" is here meant to include constant DC voltage or a constant amplitude of AC voltage.

A flow regulating means 16 is connected to switching means 14 and a side of the power source. A temperature sensitive current control means 12 is connected across the constant voltage source 10. Although not shown in the block diagram, the current control means 12 is to be disposed within liquid storage means so that it can be directly exposed to the rising liquid level as liquid is supplied to the storage means. As will become apparent, current control means 12 includes a temperature sensitive semiconductive element which is heated by the current flowing through it to an elevated temperature so that it is sensitive to the presence or absence of liquid cooling. Further, as will become apparent, when the junction of the semiconductive current control means 12 becomes exposed to the cooling effect of liquid, its temperature is reduced, assuming the liquid to be cooler than the junction of the semiconductive means. If the junction is maintained at constant voltage from the constant voltage source 10, there will result a reduction of current through the voltage source and current regulating means. Such reduction in current produces a still greater reduction of junction temperature of the current regulating means and with this positive feedback, a relatively large change in current will result. This change in current is then used to operate a switching means 14 which in turn operates fluid flow regulating means 16.

It is noted that the temperature sensitive semiconductive control means 12 would be more effectively cooled when exposed to the liquid than when exposed to an air ambient. This is due to the improved heat transfer characteristics of liquid as compared with air ambient. Thus the present control means will be operable even in those cases when the liquid temperature is substantially above the temperature of the air ambient.

Figure 2:
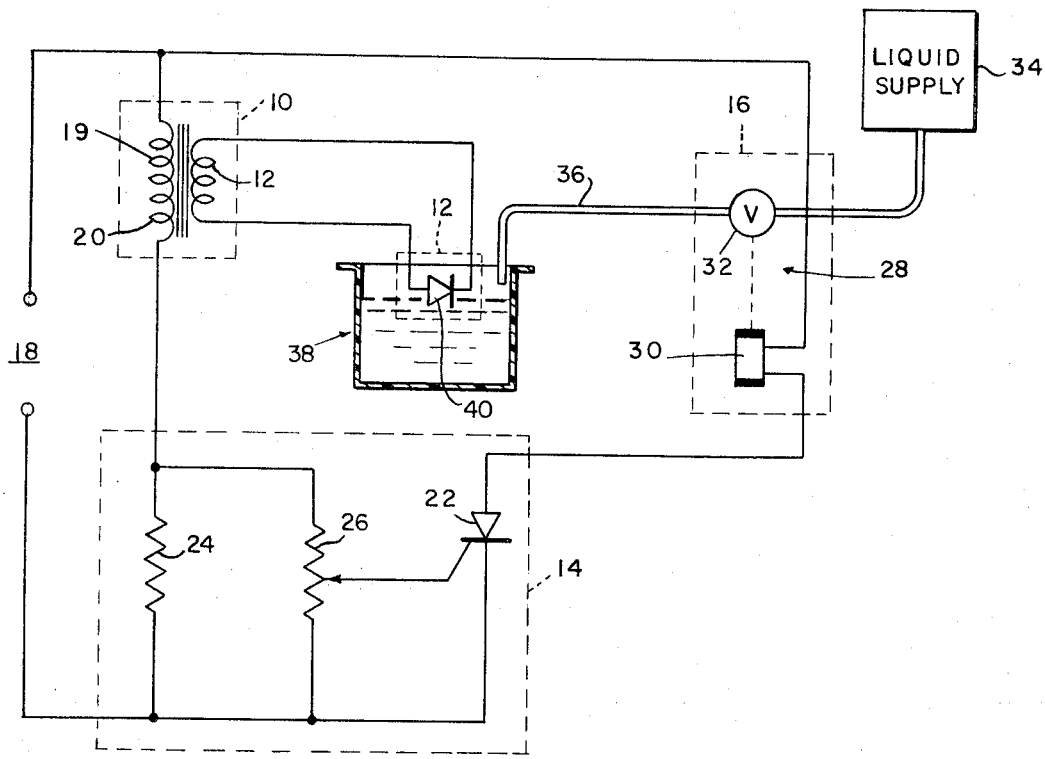
FIG. 2 is a wiring diagram showing an embodiment of the control means.

Referring now to FIG. 2, a wiring diagram of one embodiment of the invention is shown. This embodiment is particularly adaptable to the use of a solenoid for the flow regulating means which is operable on everY half wave of an AC cycle. Constant voltage source 10 includes transformer 20, the primary coil 19 of which is connected to one side of power source 18, the other side of the transformer or primary coil being connected to switching means 14. Switching means 14 includes a semiconductive switch 22 such as an SCR. As shown, the cathode of the SCR is connected to a side of the power source 18, its gate being connected to the constant power supply 20 through biasing resistors 24 and 26, with the anode of the SCR being connected to the liquid flow regulating means 16. As indicated, resistor 26 is variable so as to determine the amount of current necessary to trigger the SCR 22. Flow regulating means 16 includes a normally closed DC solenoid valve means 28 having a coil 30 operable on every half-cycle of an AC current which when energized opens valve 32 to permit a liquid to pass from liquid supply 34 through the conduit 36 to the liquid storage means 38.

The current control means 12 includes a temperature sensitive semiconductive current control means such as a diode 40 disposed within the liquid storage means 38 and connected across the secondary coil 21 of transformer 20.

In operation, diode 40 is placed in storage means 38 at or near a predetermined distance from the bottom of the storage means, such predetermined distance being determined by the desired level of the liquid. The diode 40 is biased so that forward current flow increases its junction temperature above the temperature of the liquid to be sensed. The constant voltage source 20 is connected across the power source 18. With no liquid in the storage means the junction temperature of the diode will be above air ambient and above the temperature of the liquid to be supplied in the storage means. With the junction of the diode above air ambient, the diode will draw enough current in secondary coil 21 to produce corresponding current in primary coil 19 sufficient to trigger the SCR 22 on every half cycle of the line voltage so as to energize the coil 30 of the solenoid 28 to open the valve 32 to allow liquid to pass to the storage means. When the level of the liquid reaches the diode 40, the diode is immediately cooled and the current through the secondary and primary coils of transformer 20 will be rendered to thus turn off the SCR 22, deenergize coil 30 to close valve 32 thus shutting off the liquid supply. The amount of current needed to trigger SCR 22 is dependent upon the variable resistor 26.

As previously noted, when the junction of the diode is maintained at constant voltage, there is a reduction of current when the diode is immersed in the liquid, the current reduction producing an even greater reduction in junction temperature. Because of this positive feedback, a relatively large change in current will occur. With the relatively large change in current there is a positive assurance that the semiconductive switching device 14 and the solenoid will become quickly operable to accurately control the liquid level. For maximum change in current with temperature, it is desirable to use a sensing diode 40 with a minimum of series resistance so as to maintain a more clearly constant junction voltage. An example of such a diode would be a silicon junction diode fabricated from a low resistivity silicon crystal. Also there could be more than one of such diodes, series connected.

Figure 3:
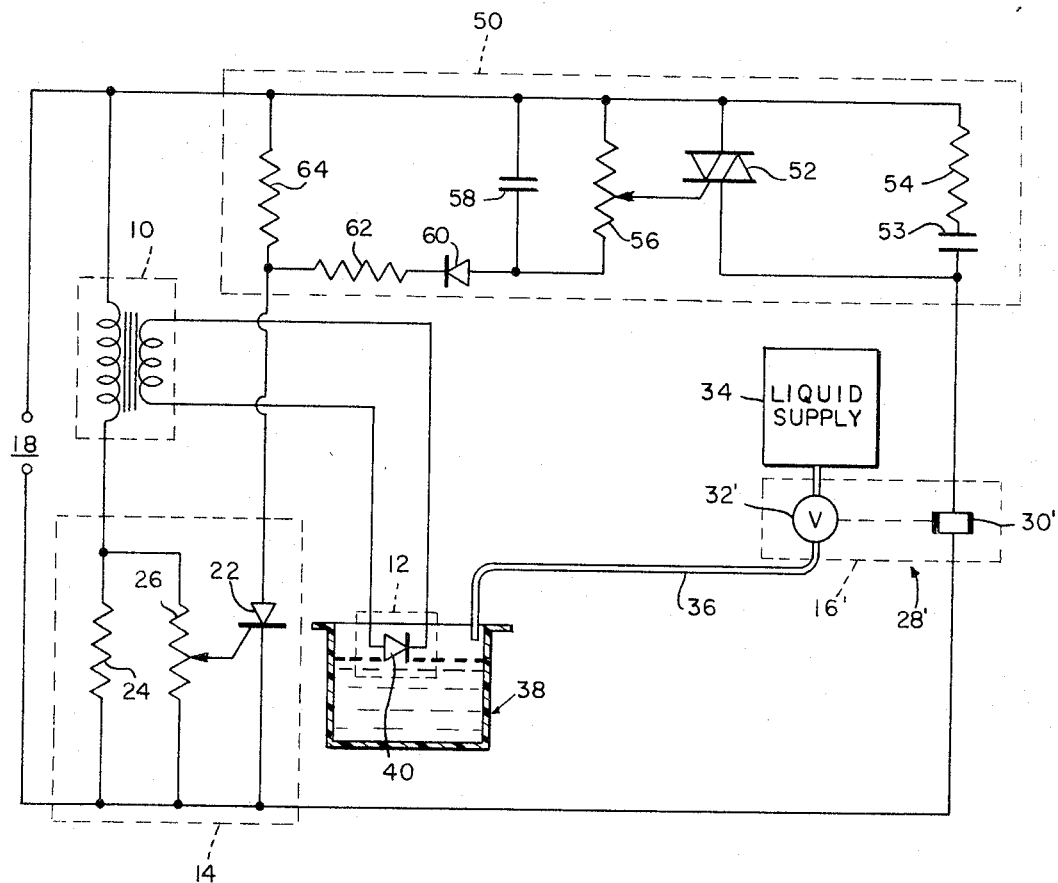
FIG. 3 is a wiring diagram showing another embodiment of the control means.

Referring now to FIG. 3 another embodiment of the invention is shown. This embodiment is particularly adaptable for operating solenoids of the type normally used in washing machines; that is, an AC solenoid operable over a full wave of AC current. In this embodiment constant voltage source 10, current control means 12, and switching means 14 are substantially the same, if not identical, to those described in FIG. 1. However, liquid flow regulating means 16' includes an AC solenoid valve means 28' which is operable on both the positive and negative side of the line voltage through the solenoid. The solenoid includes a coil 30' operating a normally closed valve 32' to open the valve and permit liquid to flow from liquid supply means to the liquid storage means 38 through 36. As was described with reference to FIG. 1, SCR 22 is triggered on every half cycle of the line voltage, but since solenoid 28' is operable on full wave voltage, means must be provided to deliver such a voltage to the solenoid. To this end, the present embodiment includes AC supply means 50 connected between switching means 14 and flow regulating means 16'. AC supply means 50 includes triac 52 connected to one side of the power source 18 and to liquid flow regulating means 16'. An R-C network including capacitor 53 and resistor 54 serves as a means to prevent excessively rapid voltage rise on triac 52 when current to solenoid 28' is interrupted. The gate of the triac is connected to the variable resistor 56. Capacitor 58 is connected in parallel to resistor 56 and to this parallel combination there is connected a diode 60 and a resistor 62 in series therewith. Resistor 64 connected between the SCR 22 and one side of the power source 18 serves as a load resistor for the SCR.

As in the embodiment of FIG. 1, when diode 40 is run in open air, it heats up and draws more current in the trAnsformer secondary and produces a corresponding current increase in the primary. This current produces a voltage across the resistor 24 in parallel with resistor 26. This voltage appears on the gate of the SCR 22 and triggers it on every half cycle of the line voltage. This sets up a pulsating DC potential across the SCR load resistor 64. This pulsating voltage is used to charge the capacitor 58 through resistor 62 and diode 60. The diode prevents the capacitor from discharging through resistors 62 and 64 during half cycles when the SCR 22 is off.

The voltage on capacitor 58 is impressed across resistor 56 and is used to trigger triac 52 on. The triac is triggered on and delivers both positive and negative sides of the line voltage to coil 30'. Coil 30' opens valve 32' and fills storage means 38 until the liquid level reaches diode 40. Then the liquid cools the diode, the SCR 22 turns off, triac 52 turns off, and solenoid means 28' closes, turning off the liquid from liquid supply 34.

What is claimed is:

1. A control means regulating a supply of liquid to a storage means comprising:
   a. a temperature sensitive semiconductive current control means disposed in said liquid storage means, said semiconductive current control means having a junction responsive to temperature changes in accordance with the presence or absence of a liquid,
   b. a constant voltage source, said constant voltage source connected directly across said semiconductive current control means so as to provide a constant voltage at said junction so as to regulate the amount of current flowing through said voltage source and said semiconductive current control means,
   c. switching means responsive to current from said constant voltage source, and
   d. liquid flow regulating means responsive to said switching.

2. A control means according to claim 1 wherein said current regulating means includes a diode.

3. A control means according to claim 2 wherein said diode is heated by forward current above the temperature of said liquid.

4. A control means according to claim 3 wherein said diode is fabricated from silicon.

5. A control means according to claim 2 wherein said voltage source includes a transformer and said diode is connected across a secondary coil of said transformer.

6. A control means according to claim 1 wherein said liquid flow regulating means includes a solenoid valve means.

7. A control means according to claim 6 wherein said solenoid valve means includes a DC solenoid valve means connected to said switching means.

8. A control means according to claim 6 wherein said solenoid valve means includes an AC solenoid valve means and wherein said solenoid valve means is responsive to said switching means through AC current supply means connected between said switching means and said half wave solenoid means.

9. A control means according to claim 8 wherein said AC current supply means includes a triac and means connected between said triac and said switching means regulating the flow of current to said triac.

10. A control means according to claim 1 wherein said switching means includes an SCR and means biasing current to said SCR.

* * * * *